United States Patent
Aida et al.

(10) Patent No.: US 12,085,452 B2
(45) Date of Patent: Sep. 10, 2024

(54) TEMPERATURE DETECTION INK, TEMPERATURE DETECTION INK INITIALIZATION METHOD, TEMPERATURE INDICATOR, AND ARTICLE MANAGEMENT SYSTEM

(71) Applicant: Hitachi Industrial Equipment Systems Co., Ltd., Tokyo (JP)

(72) Inventors: Kohhei Aida, Tokyo (JP); Shunsuke Mori, Tokyo (JP); Kotaro Araya, Tokyo (JP); Shigetaka Tsubouchi, Tokyo (JP); Masahiro Kawasaki, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 1033 days.

(21) Appl. No.: 16/963,647

(22) PCT Filed: Nov. 16, 2018

(86) PCT No.: PCT/JP2018/042462
§ 371 (c)(1),
(2) Date: Jul. 21, 2020

(87) PCT Pub. No.: WO2019/142480
PCT Pub. Date: Jul. 25, 2019

(65) Prior Publication Data
US 2021/0063252 A1    Mar. 4, 2021

(30) Foreign Application Priority Data

Jan. 22, 2018  (JP) .................................. 2018-007801

(51) Int. Cl.
C09D 11/00   (2014.01)
C09D 11/50   (2014.01)
(Continued)

(52) U.S. Cl.
CPC .............. G01K 11/16 (2013.01); C09D 11/50 (2013.01); C09K 9/02 (2013.01)

(58) Field of Classification Search
CPC .................................. C09D 11/50; C09K 9/02
(Continued)

(56) References Cited

U.S. PATENT DOCUMENTS

| 6,382,125 B1 | 5/2002 | Tamura |
| 2002/0026002 A1 | 2/2002 | Tamura et al. |

(Continued)

FOREIGN PATENT DOCUMENTS

| CN | 102321467 A | 1/2012 |
| CN | 102807853 A | 12/2012 |

(Continued)

OTHER PUBLICATIONS

Chinese language Office Action issued in Chinese Application No. 201880086452.2 dated Apr. 27, 2021 with English translation (15 pages).

(Continued)

Primary Examiner — James E McDonough
(74) Attorney, Agent, or Firm — Crowell & Moring LLP

(57) ABSTRACT

It is possible to provide a temperature detection ink, which allows color initialization by a simple method and discolors with addition of time and temperature at a reaction temperature or higher. To solve the problem, the temperature detection ink according to the present invention includes a temperature detection material and a solvent. The temperature detection material has a structure in which a thermosensitive material containing a leuco dye, a color-developing agent, and a decolorant is contained in a microcapsule, or a structure in which a phase containing the thermosensitive material is phase-separated from a matrix material. The thermosensitive material is solidified while being decolored (Continued)

by cooling from a molten state to a glass transition temperature or lower at a predetermined rate or higher. The thermosensitive material has a glass transition temperature of −20 to 60° C., and a melting point that is 60 to 250° C. and lower than the boiling point of the solvent.

5 Claims, 7 Drawing Sheets

(51) Int. Cl.
 *C09K 9/02* (2006.01)
 *G01K 11/16* (2021.01)
(58) Field of Classification Search
 USPC .......................................... 106/31.01, 31.13
 See application file for complete search history.

(56) References Cited

U.S. PATENT DOCUMENTS

| 2013/0014690 A1 | 1/2013 | Shirase |
| 2018/0306649 A1 | 10/2018 | Tada et al. |

FOREIGN PATENT DOCUMENTS

| CN | 103205250 A | | 7/2013 |
| CN | 105733554 A | | 7/2016 |
| EP | 1 055 919 A1 | | 11/2000 |
| JP | 52-6748 B2 | | 2/1977 |
| JP | H1124855 A | * | 2/1998 |
| JP | 11-248552 A | | 9/1999 |
| JP | 2000-131152 A | | 5/2000 |
| JP | 2001-41829 A | | 2/2001 |
| JP | 2001-91368 A | | 4/2001 |
| JP | 2001-348568 A | | 12/2001 |
| JP | 2002-37420 A | | 2/2002 |
| JP | 2017-106005 A | | 6/2017 |
| JP | 2017-115027 A | | 6/2017 |
| WO | WO 2011/125837 A1 | | 10/2011 |
| WO | WO 2017/068657 A1 | | 4/2017 |

OTHER PUBLICATIONS

European Communication Pursuant to Rule 164(1) EPC issued in European Application No. 18901237.0 dated Sep. 21, 2021 (15 pages).
Chinese-language Office Action issued in Chinese Application No. 201880086452.2 dated Oct. 21, 2021 with English translation (14 pages).
International Search Report (PCT/ISA/210) issued in PCT Application No. PCT/JP2018/042462 dated Dec. 18, 2018 with English translation (three pages).
Japanese-language Written Opinion (PCT/ISA/237) issued in PCT Application No. PCT/JP2018/042462 dated Dec. 18, 2018 (three pages).

* cited by examiner

FIG. 3
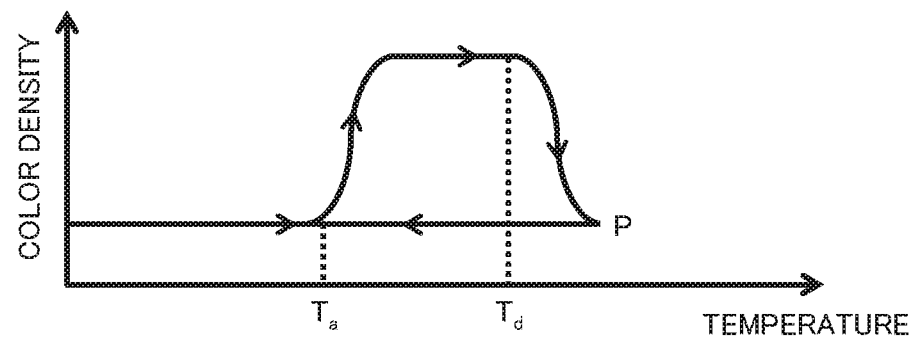
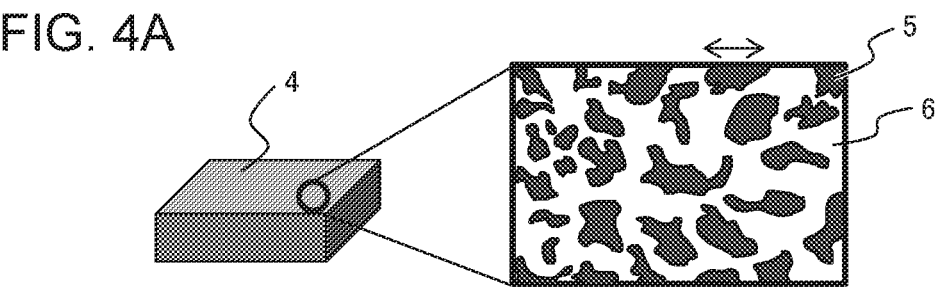
FIG. 4A
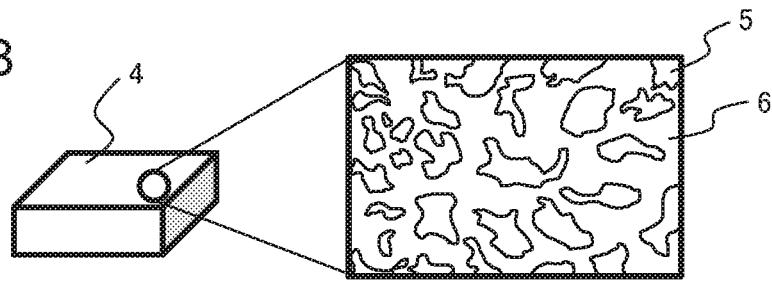
FIG. 4B

TEMPERATURE DETECTION INK, TEMPERATURE DETECTION INK INITIALIZATION METHOD, TEMPERATURE INDICATOR, AND ARTICLE MANAGEMENT SYSTEM

TECHNICAL FIELD

The present invention relates to a temperature detection ink to check temperature of a temperature detection object, a temperature detection ink initialization method, a temperature indicator, and an article management system.

BACKGROUND ART

Fresh foods, frozen foods, vaccines, and cold storage pharmaceuticals such as biopharmaceuticals require a cold chain to unintermittently maintain those at low temperature during a distribution process including production, transportation, and consumption. Actually, a data logger that can continuously record time and temperature is generally mounted in a transportation container in order to continuously measure and record temperature during distribution in many cases, which makes it possible to fix the responsibility if a product is damaged.

When quality of an individual product is controlled, a temperature indicator is used instead of the data logger in a certain method. Although the temperature indicator does not have a high recording accuracy compared with the data logger, it can be attached to the individual product. In addition, when temperature becomes higher or lower than a preset temperature, a surface of the temperature indicator is stained, allowing change in temperature environment to be known.

However, the temperature indicator problematically requires temperature control during keeping or transportation of the temperature indicator before use for product management. In addition, the temperature indicator cannot be reused. In the assumption of the temperature indicator attached to an individual product, there is a need for forgery prevention to manage an expensive product such as pharmaceuticals, and perfect irreversibility is required for the indicator after temperature excursion. However, for management of inexpensive products such as fresh foods, it is enough to be irreversible only below environmental temperature in terms of cost, and there is a need for reuse of the temperature indicator, transportation at normal temperature, or keeping at normal temperature rather than perfect irreversibility. This leads to a demand for a temperature indicator allowing color initialization by a somewhat simple method.

In the case of managing products such as fresh foods or biopharmaceuticals, the quality of which gradually deteriorates with temperature or time, a time-temperature indicator (TTI), which discolors with addition of time and temperature, is used. Examples of such a temperature indicator include an indicator that discolors through permeation of an ink, the viscosity of which varies with temperature, into a permeation material. In such a temperature indicator, however, since the ink does not serve as a temperature indicator alone, a structure of the temperature indicator is complicated, and thus price reduction is difficult. In addition, the temperature indicator cannot be reused, i.e., cannot allow color initialization.

PTL 1 discloses, as a temperature detection ink allowing color initialization, a reversible heat discoloration microencapsulated pigment containing a reversible heat discoloration composition that exhibits the following discoloration behavior: A decoloring state is changed to a coloring state by heating at a comparatively low temperature, the coloring state can be maintained even by subsequent cooling, and the state can be returned to the coloring state via the decoloring state by subsequent heating.

PTL 2 discloses a thermosensitive material, which is irreversible under environmental temperature and discolors due to crystal/amorphous transition or state change between phase separation and non-phase separation.

CITATION LIST

Patent Literature

PTL 1: Japanese Patent Application Laid-Open No. 2017-106005.
PTL 2: Japanese Patent Application Laid-Open No. 2001-348568.

SUMMARY OF INVENTION

Technical Problem

Discoloration with addition of time and temperature is not considered in the reversible heat discoloration microencapsulated pigment disclosed in PTL 1. The reversible heat discoloration microencapsulated pigment disclosed in PTL 1 exhibits the discoloration behavior: A decoloring state is changed to a coloring state by heating, the coloring state is maintained even by subsequent cooling, and the state can be returned to the coloring state via the decoloring state by subsequent heating. The reversible heat discoloration microencapsulated pigment uses the following principle: When an electron-donating coloring organic compound, an electron-accepting compound, and a reaction medium are compatible with one another, the electron-donating coloring organic compound and the electron-accepting compound are bonded together, leading to color development, and when the electron-accepting compound and the reaction medium are incompatible with each other, the bond between the electron-donating coloring organic compound and the electron-accepting compound is cut off, leading to decoloration.

Although PTL 1 discloses that the decoloring state is changed to the coloring state by heating at a comparatively low temperature, a temperature detection material, which can detect temperature at a further low temperature and allows color initialization by a simple method, is expected in a cold chain of foods, pharmaceuticals, and the like.

Since the thermosensitive material disclosed in PTL 2 uses crystal/amorphous transition or state change between phase separation and non-phase separation, the state changes from solid to liquid or from liquid to solid with temperature. The thermosensitive material is therefore difficult to be combined with other materials, such as solvent and resin, to be formed into an ink.

An object of the present invention is therefore to provide a temperature detection ink, which allows color initialization by a simple method and discolors with addition of time and temperature.

Solution to Problem

To solve the above-described problem, the temperature detection ink according to the present invention includes a temperature detection material and a solvent, wherein the temperature detection material has a structure in which a thermosensitive material containing a leuco dye, a color-developing agent, and a decolorant is contained in a microcapsule, or a structure in which a phase containing the thermosensitive material is phase-separated from a matrix material, the thermosensitive material is solidified while being decolored by cooling from a molten state to a glass transition temperature or lower at a predetermined rate or higher, the thermosensitive material has a glass transition temperature of −20 to 60° C., and a melting point that is 60 to 250° C. and lower than the boiling point of the solvent. Other aspects of the present invention are described in an embodiment as mentioned later.

Advantageous Effects of Invention

According to the present invention, it is possible to provide a temperature detection ink that allows color initialization by a simple method and discolors with addition of time and temperature at a reaction temperature or higher.

BRIEF DESCRIPTION OF DRAWINGS

FIG. 3 shows a change in color density of the thermosensitive material of FIG. 2.

FIGS. 4A and 4B include schematic views illustrating a phase separation structure of the temperature detection material.

DESCRIPTION OF EMBODIMENTS

To meet the above-described problem, the inventors have noticed a material including a leuco dye as an electron-donating compound, a color-developing agent as an electron-accepting compound, and a decolorant that controls a reaction of the electron-donating compound and the electron-accepting compound, in which when the leuco dye, the color-developing agent, and the decolorant are compatible with one another, the bond between the leuco dye and the color-developing agent is cut off, leading to decoloration, and when the color-developing agent and the decolorant are incompatible with each other due to crystallization, the leuco dye becomes compatible with the color-developing agent, leading to color development. Since such a material (hereinafter, referred to as thermosensitive material) develops a color through crystallization, the material can discolor with addition of time and temperature by controlling temperature and time required for crystallization. Further, since the thermosensitive material decolors through melting, the material is irreversible at a melting temperature or lower and allows color initialization at the melting temperature.

Modes for carrying out the present invention are now described in detail with reference to the drawings. Like reference signs designate the same parts throughout the drawings, and duplicated description is omitted.

<Temperature Detection Ink>

Figure 1:
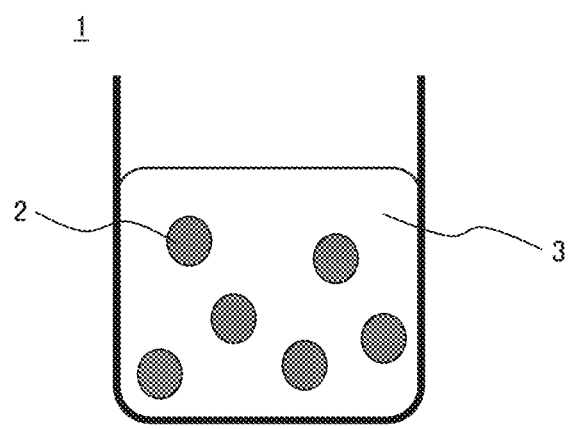
FIG. 1 is a schematic view of a temperature detection ink according to one embodiment of the present invention.

A temperature detection ink includes a temperature detection material and a solvent. FIG. 1 shows a schematic view of a temperature detection ink according to one embodiment of the present invention. The temperature detection ink 1 has a configuration in which the temperature detection material 2 is dispersed in the solvent 3. The temperature detection ink allows the temperature detection material to be applied to an ink for a pen, a stump, or a crayon, an inkjet ink, and a printing paint.

As described in detail later, using a temperature detection material, which has a structure in which a thermosensitive material containing a leuco dye, a color-developing agent, and a decolorant is contained in a microcapsule or a structure in which a phase including the thermosensitive material containing the leuco dye, the color-developing agent, and the decolorant is phase-separated from a matrix material, makes it possible to separate the thermosensitive material from other materials forming the ink through temperature detection even if a state of the thermosensitive material changes from solid to liquid or from liquid to solid.

The temperature detection ink may contain another additive in a solution such as an organic solvent or water to a degree where the additive does not affect a temperature detection function. Viscosity of the ink may also be adjusted by varying the amount of the temperature detection material or the additive. Consequently, the temperature detection ink can be used as inks for various printers such as an offset printer, a gravure printer, a flexographic printer, a label printer, and a thermal printer.

[Temperature Detection Material]

The temperature detection material has a structure in which the thermosensitive material is contained in a microcapsule or a structure in which a phase including the thermosensitive material is phase-separated from a matrix material. In this description, a configuration where the thermosensitive material is protected so as not to be eluted in the solvent of the ink is referred to as temperature detection material.

(Thermosensitive Material)

A material used for the thermosensitive material is a material that reversibly changes its color density with temperature change (temperature rise/temperature drop) and is solidified while being decolored by cooling from a molten state to its glass transition temperature or lower at a predetermined rate or higher. The thermosensitive material contains a leuco dye as an electron-donating compound, a color-developing agent as an electron-accepting compound, and a decolorant to control coloring temperature.

Figure 2:
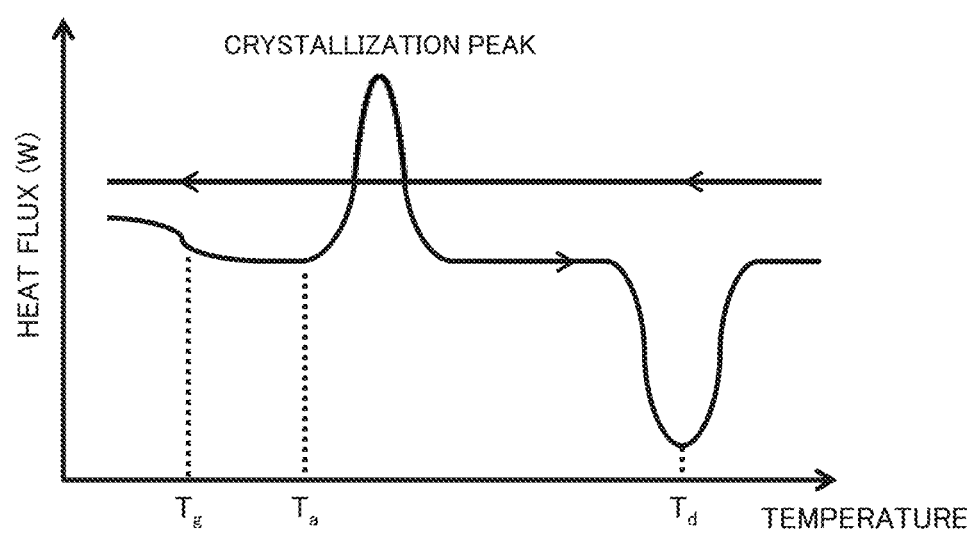
FIG. 2 shows a differential scanning calorimetry measurement curve of a thermosensitive material.

FIG. 2 shows a differential scanning calorimetry measurement (DSC) curve of the thermosensitive material according to one embodiment of the present invention. No exothermic peak caused by crystallization is observed in a temperature drop process (a left-pointing arrow (←) in the figure). On the other hand, an exothermic peak caused by crystallization is observed in a temperature rise process (a right-pointing arrow (→) in the figure). $T_a$ is crystallization start temperature in the temperature rise process, $T_g$ is glass transition temperature, and $T_d$ is melting point.

FIG. 3 shows a change in color density of the thermosensitive material of FIG. 2. In FIG. 3, the vertical axis represents color density, and the horizontal axis represents temperature. FIG. 3 reveals that the thermosensitive material has a hysteresis characteristic in the change in color density. When the thermosensitive material is heated to the crystallization start temperature $T_a$, it changes from a decoloring state to a color developing state. If the thermosensitive material is still heated while being color-developed, decoloring starts at the melting point $T_d$. The thermosensitive material is solidified while being decolored by cooling from the molten state to the glass transition temperature or lower at a predetermined rate or higher. As seen in FIG. 2, the thermosensitive material is solidified while being in an amorphous state.

The crystallization start temperature $T_a$ varies depending on heating rate or elapsed time. In slow heating, the start temperature appears at a low temperature. In rapid heating, the start temperature appears at a high temperature, or no start temperature appears and the thermosensitive material is melted at the melting point $T_d$. Since color development occurs with crystallization, the crystallization start temperature $T_a$ may be set in accordance with requirements of detection temperature and detection time. For example, in the case of a thermosensitive material of which the crystallization starts after the lapse of one hour at a certain temperature, the thermosensitive material can be used as a material to detect the passage of one hour at the start temperature defined to be the certain temperature.

Crystallization does not start at a temperature lower than the glass transition temperature. In the case of an easily crystallizable material, since the material is readily crystallized at a temperature equal to or higher than the glass transition temperature, the start temperature is often equal to the glass transition temperature. In the case of using an uneasily crystallizable material as the decolorant of the thermosensitive material, when the thermosensitive material is rapidly cooled from a molten state P at the decoloring temperature $T_d$ or higher to the color-developing temperature $T_a$ or lower, the decolorant forms an amorphous state while capturing the color-developing agent, allowing the decoloring state to be maintained. If temperature is raised to the color-developing temperature $T_a$ or higher in such a state, the decolorant is crystallized, leading to color development.

In the case of using a thermosensitive material that reversibly changes a color with temperature change, even if once temperature rises and the color of the thermosensitive material is changed, the color is undesirably reversed by decreasing or increasing the temperature again, and thus the presence of temperature change cannot be known. However, if a material has a hysteresis characteristic in change in color density, its color does not reverse unless the material is heated to a molten state at the decoloring temperature $T_d$ or higher, allowing a change in temperature environment to be known.

The glass transition temperature of the thermosensitive material is −20 to 60° C., preferably −20 to 25° C., and more preferably −20 to 15° C. Temperature control states of fresh foods, frozen foods, vaccines, and cold storage articles such as biopharmaceuticals can be detected by adjusting the glass transition temperature to −20 to 15° C.

The melting point of the thermosensitive material is 60 to 250° C. and lower than a boiling point of the solvent. A color initialization temperature must be separated from a temperature to be detected such that a temperature history can be checked, and color initialization does not occur near the temperature to be detected (upper limit of control temperature). On the other hand, the initialization temperature is preferably in a temperature range in which the material can be heated by a versatile apparatus in light of ease of initialization. The melting point of the thermosensitive material is therefore 60 to 250° C., preferably 60 to 150° C.

In this way, using the thermosensitive material according to this embodiment makes it possible to provide a temperature detection material that discolors with addition of time and temperature and allows color initialization by high-temperature heating.

The leuco dye, the color-developing agent, and the decolorant of the thermosensitive material are now described.

A usable leuco dye includes previously known leuco dyes that are each an electron-donating compound and used for pressure sensitive copying paper or thermal paper. Examples of such a dye include dyes of triphenylmethane phthalide series, fluoran series, phenothiazine series, indolyl phthalide series, leuco auramine series, spiropyran series, rhodamine lactam series, triphenylmethane series, triazene series, spirophthalan xanthene series, naphtholactam series, and azomethine series. Specific examples of the leuco dye include 9-(N-ethyl-N-isopentylamino)spiro[benzo[a]xanthene-12, 3'-phthalide], 2-methyl-6-(Np-tolyl-N-ethylamino)fluoran-6-(diethylamino)-2-[(3-trifluoromethyl)anilino] xanthene-9-spiro-3'-phthalide, 3, 3-bis(p-diethylaminophenyl)-6-diethylamino phthalide, 2'-anilino-6'-(dibutylamino)-3'-methylspiro[phthalide-3, 9'-xanthene], 3-(4-diethylamino-2-methylphenyl)-3-(1-ethyl-2-methylindole-3-yl)-4-azaphthalide, and 1-ethyl-8-[N-ethyl-N-(4-methylphenyl)amino]-2, 2, 4-trimethyl-1, 2-dihydrospiro[11H-chromeno[2, 3-g]quinoline-11, 3'-phthalide].

At least two leuco dyes may be used in combination for the thermosensitive material.

The color-developing agent changes a structure of the leuco dye through contact with the electron-donating leuco dye and thus causes coloration. Known color-developing agents used for pressure sensitive copying paper or thermal paper can be used as the color-developing agent. Specific examples of such a color-developing agent may include phenols such as benzyl 4-hydroxybenzoate, 2, 2'-biphenol, 1, 1-bis(3-cyclohexyl-4-hydroxyphenyl)cyclohexane, 2, 2-bis(3-cyclohexyl-4-hydroxyphenyl)propane, bisphenol A, bisphenol F, bis(4-hydroxyphenyl) sulfide, para-hydroxybenzoate, and gallic acid ester. Any compound can be used without limitation if the compound is an electron acceptor and can discolor the leuco dye. In addition, the usable compound may include metallic salts of carboxylic acid derivatives, salicylic acid and salicylate metal salts, sulfonic acids, sulfonate salts, phosphoric acids, phosphate metal salts, acid phosphate esters, acid phosphate metal salts, phosphorous acids; and phosphite metal salts. In particular, a preferable color-developing agent is highly compatible with the leuco dye or the decolorant as described later, including organic color-developing agents such as benzyl 4-hydroxybenzoate, 2, 2'-biphenol, bisphenol A, and gallic acid esters.

The thermosensitive material may include two or more of such color-developing agents. A combination of two or more color-developing agents makes it possible to adjust color density of the leuco dye in the colored state. Usage of the color-developing agent is selected depending on a desired color density. For example, the usage may be typically selected within a range from about 0.1 to 100 mass parts for 1 mass part of the leuco dye.

The decolorant is a compound that can dissociate the bond of the leuco dye and the color-developing agent and can control the coloring temperature of the leuco dye with the color-developing agent. The decolorant is typically solidified while being phase-separated in a temperature range where the leuco dye is colored. In a temperature range where the leuco dye is decolored, the decolorant is melted and exhibits the function of dissociating the bond of the leuco dye and the color-developing agent. The state change temperature of the decolorant is therefore important to control temperature of the thermosensitive material.

Any material can be used as a material of the decolorant if the material can dissociate the bond of the leuco dye and the color-developing agent. Various materials may each be used as the decolorant if the material exhibits no color developing property to the leuco dye and has a polarity high enough to dissolve the leuco dye and the color-developing agent.

Various organic compounds can be typically used, such as hydroxy compounds, ester compounds, peroxy compounds, carbonyl compounds, aromatic compounds, aliphatic compounds, halides, amino compounds, imino compounds, N-oxide compounds, hydroxylamine compounds, nitro compounds, azo compounds, diazo compounds, azide compounds, ether compounds, fatty compounds, sugar compounds, peptide compounds, nucleic acid compounds, alkaloid compounds, and steroid compounds. Specifically, the decolorant includes ester compounds such as tricaprin, isopropyl myristate, m-tolyl acetate, diethyl sebacate, dimethyl adipate, 1,4-diacetoxybutane, decanoic acid decyl ester, diethyl phenylmalonate, diisobutyl phthalate, triethyl citrate, benzyl butyl phthalate, butyl phthalyl butyl glycolate, methyl N-methylanthranilate, ethyl anthranilate, 2-hydroxyethyl salicylate, methyl nicotinate, butyl 4-aminobenzoate, methyl p-toluate, ethyl 4-nitrobenzoate, 2-phenylethyl phenylacetate, benzyl cinnamate, methyl acetoacetate, geranyl acetate, dimethyl succinate, dimethyl sebacate, diethyl oxalacetate, monoolein, butyl palmitate, ethyl stearate, methyl palmitate, methyl stearate, linalyl acetate, di-n-octyl phthalate, benzyl benzoate, diethylene glycol dibenzoate, methyl p-anisate, m-tolyl acetate, cinnamyl cinnamate, 2-phenylethyl propionate, butyl stearate, ethyl myristate, methyl myristate, methyl anthranilate, neryl acetate, isopropyl palmitate, ethyl 4-fluorobenzoate, 3,3,5-trimethylcyclohexyl mandelate (mixture of isomers), butopyronoxyl, ethyl 2-bromopropionate, tricaprilin, ethyl levulinate, hexadecyl palmitate, tert-butyl acetate, 1,1-ethanediol diacetate, dimethyl oxalate, tristearin, trimyristin, methyl acetylsalicylate, benzal diacetate, methyl 2-benzoylbenzoate, ethyl 2,3-dibromobutyrate, ethyl 2-furancarboxylate, ethyl 2,4-dioxovalerate, ethyl vanillate, dimethyl itaconate, methyl 3-bromobenzoate, monoethyl adipate, dimethyl adipate, 1,4-diacetoxybutane, diethylene glycol diacetate, ethyl palmitate, diethyl terephthalate, phenyl propionate, phenyl stearate, 1-naphthyl acetate, methyl behenate, methyl arachidate, methyl 4-chlorobenzoate, methyl sorbate, ethyl isonicotinate, dimethyl dodecanedioate, methyl heptadecanoate, ethyl α-cyanocinnamate, N-phenylglycine ethyl ester, diethyl itaconate, methyl picolinate, methyl isonicotinate, methyl DL-mandelate, methyl 3-aminobenzoate, methyl 4-methylsalicylate, diethyl benzylidenemalonate, isoamyl DL-mandelate, triethyl methanetricarboxylate, diethyl formamidomalonate, 1,2-bis(chloroacetoxy)ethane, methyl pentadecanoate, ethyl arachidate, ethyl 6-bromohexanoate, monoethyl pimelate, hexadecyl lactate, ethyl benzilate, mefenpyr-diethyl, procaine, dicyclohexyl phthalate, 4-tert-butylphenyl salicylate, isobutyl 4-aminobenzoate, butyl 4-hydroxybenzoate, tripalmitin, 1,2-diacetoxybenzene, dimethyl isophthalate, monoethyl fumarate, methyl vanillate, methyl 3-amino-2-thiophenecarboxylate, etomidate, clo-
quintocet-mexyl, methyl benzilate, diphenyl phthalate, phenyl benzoate, propyl 4-aminobenzoate, ethylene glycol dibenzoate, triacetin, ethyl pentafluoropropionate, methyl 3-nitrobenzoate, 4-nitrophenyl acetate, methyl 3-hydroxy-2-naphthoate, trimethyl citrate, ethyl 3-hydroxybenzoate, methyl 3-hydroxybenzoate, trimebutine, 4-methoxybenzyl acetate, pentaerythritol tetraacetate, methyl 4-bromobenzoate, ethyl 1-naphthaleneacetate, 5-nitro-2-furaldehyde diacetate, ethyl 4-aminobenzoate, propylparaben, 1,2,4-triacetoxybenzene, methyl 4-nitrobenzoate, diethyl acetamidomalonate, valethamate bromide, 2-naphthyl benzoate, dimethyl fumarate, adiphenine hydrochloride, benzyl 4-hydroxybenzoate, ethyl 4-hydroxybenzoate, vinyl butyrate, vitamin K4, methyl 4-iodobenzoate, methyl 3,3-dimethylacrylate, propyl gallate, 1,4-diacetoxybenzene, diethyl mesoxalate, dimethyl 1,4-cyclohexanedicarboxylate (mixture of cis- and trans-), triethyl 1,1,2-ethanetricarboxylate, dimethyl hexafluoroglutarate, amyl benzoate, ethyl 3-bromoberzoate, ethyl 5-bromo-2-chlorbenzoate, bis(2-ethylhexyl phthalate, diethyl allylmalonate, diethyl bromomalonate, diethyl ethoxymethylenemalonate, diethyl ethylmalonate, diethyl fumarate, diethyl maleate, diethyl malonate, diethyl phthalate, dimethyl 1,3-acetonedicarboxylate, dimethyl phthalate, ethyl 3-aminobenzoate, ethyl benzoate, ethyl 4-dimethylaminobenzoate, ethyl nicotinate, ethyl phenylpropiolate, ethyl pyridine-2-carboxylate, ethyl 2-pyridylacetate, ethyl 3-pyridylacetate, methyl benzoate, ethyl phenylacetate, amyl 4-hydroxybenzoate, 2,5-diacetoxytoluene, ethyl 4-oxazolecarboxylate, trimethyl 1,3,5-cyclohexanetricarboxylate (mixture of cis- and trans-), methyl 3-(chlorosulfonyl)-2-thiophenecarboxylate, pentaerythritol distearate, benzyl laurate, diethyl acetylenedicarboxylate, phenyl methacrylate, benzyl acetate, dimethyl glutarate, ethyl 2-ozocyclohexanecarboxylate, ethyl phenylcyanoacetate, ethyl 1-piperazinecarboxylate, methyl benzoylformate, methyl phenylacetate, phenyl acetate, diethyl succinate, tributyrin, diethyl methylmalonate, dimethyl oxalate, diethyl 1,1-cyclopropane dicarboxyliate, dibenzyl malonate, methyl 4-tert-butylbenzoate, ethyl 2-oxocyclopentanecarboxylate, methyl cyclohexanecarboxylate, ethyl 2-(4-methoxyphenyl)acetate, methyl 4-fluorobenzoylacetate, dimethyl maleate, methyl terephthalaldehydate, ethyl 4-bromobenzoate, methyl 2-bromobenzoate, methyl 2-iodobenzoate, ethyl 3-iodobenzoate, ethyl 3-furancarboxylate, diallyl phthalate, benzyl bromoacetate, dimethyl bromomalonate, methyl m-toluate, diethyl 1,3-acetonedicarboxylate, methyl phenylpropiolate, 1-naphthyl butyrate, ethyl o-toluate, methyl 2-oxocyclopentanecarboxylate, isobutyl benzoate, ethyl 3-phenylpropionate, di-tert-butyl malonate, dibutyl sebacate, diethyl adipate, diethyl terephthalate, dipropyl phthalate, 1,1-ethanediol diacetate, diisopropyl adipate, diisopropyl fumarate, ethyl cinnamate, 2-ethylhexyl 2-cyano-3,3-diphenylacrylate, neopentyl glycol diacrylate, triolein, ethyl benzoylacetate, ethyl p-anisate, diethyl suberate, sorbitan tristearate, sorbitan monostearate, stearamide, glycerol monostearate, glycerol distearate, 3-(tert-butoxycarbonyl)phenylboronic acid, racecadotril, 4-[(6-acryloyloxy)hexyloxy]-4'-cyanobiphenyl, 2-(dimethylamino)vinyl 3-pyridyl ketone, stearyl acrylate, ethyl 4-bromophenylacetate, dibenzyl phthalate, methyl 3,5-dimethoxybenzoate, eugenol acetate, didodecyl 3,3'-thiodipropionate, vanillin acetate, diphenyl carbonate, ethyl oxanilate, methyl terephthalaldehydate, dimethyl 4-nitrophthalate, ethyl (4-nitrobenzoyl)acetate, dimethyl nitroterephthalate, methyl 2-methoxy-5-(methylsulfonyl)benzoate, methyl 3-methyl-4-nitrobenzoate, dimethyl 2,3-naphthalenedicarboxylate, bis-(2-ethylhexyl) adipate, 4'-acetoxyacetophenone, ethyl trans- 3-benzoylacrylate, ethyl coumarin-3-carboxylate, BAPTA tetraethyl ester, methyl 2,6-dimethoxybenzoate, di-tert-butyl iminodicarboxylate, benzyl p-benzyloxybenzoate, methyl 3,4,5-trimethoxybenzoate, methyl 3-amino-4-methoxybenzoate, ethylene glycol distearate, ditetradecyl 3,3'-thiodipropionate, ethyl 4-nitrophenylacetate, methyl 4-chloro-3-nitrobenzoate, 1,4-dipropionyloxybenzene, dimethyl terephthalate, ethyl 4-nitrocinnamate, dimethyl 5-nitroisophthalate, triethyl 1,3,5-benzenetricarboxylate, diethyl N-(4-aminobenzoyl)-L-glutamate, 2-methyl-1-naphthyl acetate, 7-acetoxy-4-methylcoumarin, methyl 4-amino-2-methoxybenzoate, 4,4'-diacetoxybiphenyl, dimethyl 5-aminoisophthalate, diethyl 1,4-dihydro-2,6-dimethyl-3,5-pyridinedicarboxylate, dimethyl 4,4'-biphenyldicarboxylate, 4-benzyloxyphenylethyl octanoate, 4-benzyloxyphenylethyl nonanoate, 4-benzyloxyphenylethyl decanoate, 4-benzyloxyphenylethyl undecanoate, 4-benzyloxyphenylethyl dodecanoate, 4-benzyloxyphenylethyl tridecanoate, 4-benzyloxyphenylethyl tetradecanoate, 4-benzyloxyphenylethyl pentadecanoate, 4-benzyloxyphenylethyl hexadecanoate, 4-benzyloxyphenylethyl heptadecanoate, 4-benzyloxyphenylethyl octadecanoate, 1,1-diphenylmethyl octanoate, 1,1-diphenylmethyl nonanoate, 1,1-diphenylmethyl decanoate, 1,1-diphenylmethyl undecanoate, 1,1-diphenylmethyl dodecanoate, 1,1-diphenylmethyl tridecanoate, 1,1-diphenylmethyl tetradecanoate, 1,1-diphenylmethyl pentadecanoate, 1,1-diphenylmethyl hexadecanoate, 1,1-diphenylmethyl heptadecanoate, and 1,1-diphenylmethyl octadecanoate; and steroid compounds such as cholesterol, cholesteryl bromide, β-estradiol, methylandrostenediol, pregnenolone, cholesterol benzoate, cholesterol acetate, cholesterol linoleate, cholesterol palmitate, cholesterol stearate, cholesterol n-Octanoate, cholesteryl oleate, 3-chlorocholestene, cholesterol trans-cinnamate, cholesteryl decanoate, cholesterol hydrocinnamate, cholesterol laurate, cholesterol butyrate, cholesterol formate, cholesterol heptanoate, cholesterol hexanoate, cholesterol hydrogen succinate, cholesterol myristate, cholesterol propionate, cholesterol valerate, cholesterol hydrogen phthalate, cholesterol phenylacetate, cholesterol chloroformate, cholesterol 2,4-dichlorobenzoate, cholesterol pelargonate, cholesterol nonyl carbonate, cholesterol heptyl carbonate, cholesterol oleyl carbonate, cholesterol methyl carbonate, cholesterol ethyl carbonate, cholesterol isopropyl carbonate, cholesterol butyl carbonate, cholesterol isobutyl carbonate, cholesterol amyl carbonate, cholesterol n-octyl carbonate, cholesterol hexyl carbonate, allylestrenol, altrenogest, 9(10)-dehydronandrolone, estrone, ethynylestradiol, estriol, estradiol benzoate, β-estradiol 17-cypionate, β-estradiol 17-valerate, α-estradiol, β-estradiol 17-heptanoate, gestrinone, mestranol, 2-methoxy-β-estradiol, nandrolone, (−)-norgestrel, quinestrol, trenbolone, tibolone, stanolone, androsterone, abiraterone, abiraterone acetate, dehydroepiandrosterone, dehydroepiandrosterone acetate, ethisterone, epiandrosterone, 17β-hydroxy-17-methylandrosta-1,4-dien-3-one, methylandrostenediol, methyltestosterone, Δ9(11)-Methyltestosterone, 1α-methylandrostan-17β-ol-3-one, 17α-methylandrostan-17β-ol-3-one, stanozolol, testosterone, testosterone propionate, altrenogest, 16-dehydropregnenolone acetate, acetic acid 16,17-epoxypregnenolone, 11α-hydroxyprogesterone, 17α-hydroxyprogesterone caproate, 17α-hydroxyprogesterone, pregnenolone acetate, 17α-hydroxyprogesterone acetate, megestrol acetate, medroxyprogesterone acetate, pregnenolone acetate, 5β-pregnane-3α,20α-diol, budesonide, corticosterone, cortisone acetate, cortisone, cortexolone, deoxycorticosterone acetate, deflazacort, hydrocortisone acetate, hydrocortisone, hydrocortisone 17-butyrate, 6α-methylprednisolone, prednisolone, prednisone, prednisolone acetate, sodium deoxycholate, sodium cholate, methyl cholate, methyl hyodeoxycholate, β-cholestanol, cholesterol-5α,6α-epoxide, diosgenin, ergosterol, β-sitosterol, stigmasterol, and β-sitosterol acetate. Such compounds are preferably contained in light of compatibility with each of the leuco dye and the color-developing agent. Naturally, any material can be used without limiting to the compounds if the material can dissociate the bond of the leuco dye and the color-developing agent.

The thermosensitive material may contain at least two of such decolorants. The solidification point, the crystallization speed, and the melting point can be adjusted by combining at least two of the decolorants.

The decolorant of the thermosensitive material used for temperature detection must be uncrystallized during rapid cooling from a temperature, at which the decolorant is melted, and be amorphized near the glass transition temperature. A preferable material is therefore less likely to be crystallized. Most materials form an amorphous state at an extremely high rapid-cooling rate. In light of practicality, however, a preferable material is less likely to be crystallized to the degree where an amorphous state is formed by rapid cooling using a versatile cooling device. A more preferable material is less likely to be crystallized to the degree where the amorphous state is formed during natural cooling from a molten state at the melting point or higher. In such a condition, a preferable decolorant forms the amorphous state when it is cooled from the melting point to the glass transition temperature at a rate of 1° C./min or higher, more preferably at a rate of 20° C./min or higher.

To initialize a color, temperature must be increased to at least the melting point of the decolorant of the thermosensitive material. Although the color initialization temperature must be high enough to avoid initialization near the control temperature, the temperature is desirably within a heatable temperature range by a versatile heating device in light of practicality. Since a microcapsule and a matrix material are used in the temperature detection material to protect the thermosensitive material, heat resistance of such materials must be considered. Specifically, the color initialization temperature is preferably around 60 to 250° C., more preferably around 60 to 150° C.

(Microcapsule)

Description is now given on a structure where the thermosensitive material is contained in a microcapsule.

A resin coating used for the microcapsule may include, but not limited to, a urea resin coating including polyvalent amine and a carbonyl compound, a melamine resin coating including melamine/formalin prepolymer, methylolmelamine prepolymer, or methylated melamine prepolymer, an urethane resin coating including a polyvalent isocyanate and a polyol compound, an amide resin coating including polybasic acid chloride and polyvalent amine, and a vinyl series resin coating including any of various monomers of vinyl acetate, styrene, (meth)acrylic ester, acrylic nitrile, vinyl chloride, and the like. Further, the resultant resin coating is subjected to surface treatment to adjust surface energy in formation of ink or paint, allowing additional processing as to improve dispersing stability of the microcapsule.

The diameter of the microcapsule is preferably within a range from about 0.1 to 100 μm, more preferably within a range from 0.1 to 10 μm in light of device compatibility, preservation stability, and the like.

Various known methods can be used for microencapsulation. Examples of such method may include, but not limited to, an emulsion polymerization method, a suspension polymerization method, a coacervation method, an interfacial polymerization method, and a spray drying method. A combination of two or more different methods may also be used.

Microencapsulation improves environment resistance of the thermosensitive material against light, humidity, or the like, allowing improvement in preservation stability, stabilization of the discoloration characteristics, and the like. In addition, microencapsulation makes it possible to suppress influence on the leuco dye, the color-developing agent, and the decolorant from another compound such as a resin agent and an additive during ink preparation.

(Phase Separation Structure)

Description is now given on a structure in which a phase including the thermosensitive material is phase-separated from a matrix material (hereinafter, referred to as phase separation structure). As with the microcapsule, the phase separation structure makes it possible to improve preservation stability and stabilize the discoloration characteristics by a method simpler than the microencapsulation. In addition, the phase separation structure makes it possible to suppress influence on the leuco dye, the color-developing agent, and the decolorant from another compound such as a resin agent and an additive during ink preparation.

Figure 5A:
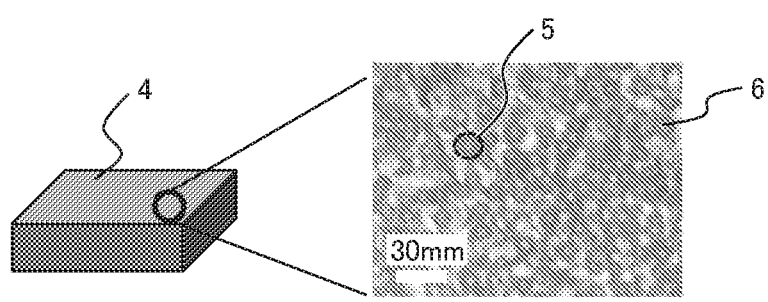
FIGS. 5A and 5B include optical micrographs of the temperature detection material.
Figure 5B:
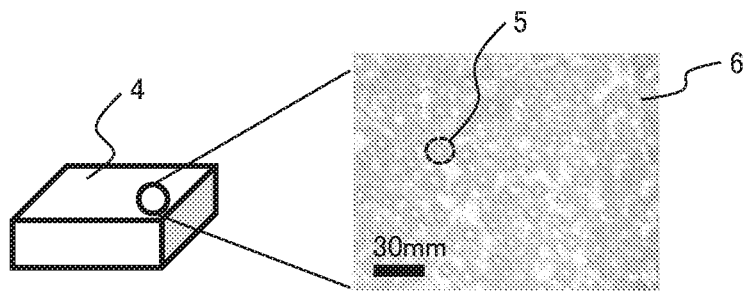

FIG. 4 includes schematic views illustrating a phase separation structure of the temperature detection material, where (a) shows a color-developing state, and (b) shows a decoloring state. FIG. 5 includes optical micrographs of the temperature detection material according to this embodiment, where (a) shows a color-developing state, and (b) shows a decoloring state. A temperature detection material 4 has a phase separation structure in which a thermosensitive material 5 is dispersed in a matrix material 6. Specifically, the temperature detection material 4 has a structure in which a phase including the thermosensitive material containing the leuco dye, the color-developing agent, and the decolorant is dispersed in the matrix material. The optical micrographs also reveal that the temperature detection material 4 has the phase separation structure in which the thermosensitive material 5 is dispersed in the matrix material 6.

The matrix material must not deteriorate a color developing property and a decoloring property of the thermosensitive material when it is mixed with the thermosensitive material. The matrix material therefore preferably exhibits no color-developing property. Such a material includes a nonpolar material other than the electron acceptor.

To form the phase separation structure in which the thermosensitive material is dispersed in the matrix material, the matrix material is required to be solid at an operating temperature of the temperature detection material, to have a melting point higher than the melting point of the thermosensitive material, and to be less compatible with the leuco dye, the decolorant, and the color-developing agent.

The matrix material is solid at an operating temperature of the temperature detection material and has a melting point higher than the melting point of the thermosensitive material, allowing the temperature detection material to maintain solid even if the thermosensitive material changes from solid to liquid or from liquid to solid. In addition, the temperature detection material is less compatible with the leuco dye, the decolorant, and the color-developing agent, allowing the temperature detection function of the thermosensitive material to be maintained.

A matrix material satisfying such conditions preferably includes a material having energy $\delta_p$ of 3 or less given by dipole interaction between molecules predicted by Hansen solubility parameter and energy $\delta_h$ of 3 or less given by hydrogen bonding between molecules. Specifically, the matrix material includes a material having no polar group or a material composed of hydrocarbon only. More specifically, the matrix material includes waxes of paraffin series, microcrystalline series, olefin series, polypropylene series, and polyethylene series; low-molecular or high-molecular materials having many skeletons of propylene, ethylene, styrene, cycloolefin, siloxane, and terpene; and copolymers of such materials.

Of these, a material, which forms a low-viscosity melt at a melting point or higher and is readily solidified at a melting point or lower, is preferable because of ease in handling. A material, which is dissolved in an organic solvent and solidified in a volatilization process of the organic solvent, is also ease in handling. Paraffin wax, microcrystalline wax, polyolefin, and terpene resin are each particularly preferable as a matrix material. Examples of the polyolefin include low-molecular polyethylene and low-molecular polypropylene. Although the molecular weight of the polyolefin and viscosity in a liquid state thereof are not limited, a preferable polyolefin has a low viscosity in the liquid state because of less bubble inclusion and good formability. Specifically, the molecular weight and the viscosity near the melting point are preferably 50,000 or less and 10 Pa·S or less, more preferably 10,000 or less and 1 Pa·S or less, respectively.

A plurality of such matrix materials may be used in combination.

The matrix material, which is liquid at the operating temperature, can also be used as the temperature detection material if it exhibits a phase separation structure with the thermosensitive material and the solvent of the temperature detection ink. If the matrix material is a high-viscosity liquid, it is good in handling as with the matrix material in a solid state. However, when the matrix material is the high-viscosity liquid, the thermosensitive material unavoidably precipitates in the matrix material in long-term use, and the matrix material is finally separated into two phases. This leads to low long-term stability of the temperature detection material.

Although concentration of the thermosensitive material contained in the matrix material is not limited, the matrix material is preferably contained within a range from 0.1 to 100 mass part with respect to 1 mass part of the thermosensitive material. Concentration of the matrix material of 100 mass part or less with respect to 1 mass part of the thermosensitive material makes it possible to suppress reduction in visibility of the temperature detection material. The concentration of the matrix material is adjusted to be equal to or higher than the concentration of the thermosensitive material, making it possible to suppress formation of a structure (hereinafter, referred to as co-continuous structure) in which the matrix material and the thermosensitive material are linked together. In the co-continuous structure, the matrix material is also phase-separated from the thermosensitive material, and thus the function of the thermosensitive material is not deteriorated, but the thermosensitive material may leak from within the matrix material, and thus long-term stability may be deteriorated. The matrix material is further preferably within a range from about 1 to 10 mass part with respect to 1 mass part of the thermosensitive material.

The major axis of the phase including the thermosensitive material dispersed in the matrix material is preferably 100 nm to 1 mm, and more preferably 1 to 100 μm. While not limited, the size of the phase including the thermosensitive material is adjusted to 100 nm or more, making it possible to suppress influence of an interface between the thermosensitive material and the matrix material on detection temperature. The major axis is adjusted to 1 mm or less, thereby the thermosensitive material is difficult to be visually distinguished from the matrix material, making it possible to suppress color nonuniformity of the temperature detection material. The size of the phase including the thermosensitive material can be reduced by addition of a surfactant or cooling with stirring in a cooling step. The major axis of the phase including the thermosensitive material means a major axis of an approximate ellipse given by approximating the phase including the thermosensitive material to an ellipse.

The phase separation structure can be powdered by crushing using a mortar or the like. This allows the phase separation structure to be handled in the same way as the microcapsule.

The phase separation structure and the microcapsule may be subjected to surface treatment, such as silane coupling treatment, surface grafting, or corona treatment, to improve dispersion stability for ink formation, solvent resistance, and environment resistance against light or humidity. The phase separation structure and the microcapsule can be further covered with a matrix material or a microcapsule.

The phase separation structure can be produced by the following method, for example. The leuco dye, the color-developing agent, the decolorant, and the matrix material are heated to a temperature equal to or higher than the melting point of the matrix material and mixed. The resultant mixture is cooled to a temperature equal to or lower than the solidification point of the matrix material. The matrix material and the thermosensitive material are quickly phase-separated in a cooling process, and the phase separation structure, in which a phase including the leuco dye, the color-developing agent, the decolorant is dispersed in the matrix material, is formed.

When the materials are heated to the temperature equal to or higher than the melting point of the matrix material, the thermosensitive material may be compatible or incompatible with the matrix material depending on compatibility with the matrix material. In such a case, the thermosensitive material is preferably compatible with the matrix material in light of ease in handling. The thermosensitive material and the matrix material are necessary to be phase-separated from each other at the operating temperature where the matrix material is solid, but not necessary to be phase-separated from each other in a heated state where the matrix material is liquid. Polarity of the decolorant to be used may be adjusted to allow the thermosensitive material and the matrix material to be phase-separated from each other at the operating temperature and to be compatible with each other in a heated state. Extremely small polarity of the decolorant causes the matrix material and the thermosensitive material to be compatible with each other at the operating temperature of the temperature detection material, and extremely large polarity of the decolorant causes the matrix material and the thermosensitive material to be separated from each other in a heated state. Specifically, a preferably usable material has energy $\delta_p$ of 1 to 10 given by dipole interaction between molecules predicted by Hansen solubility parameter and energy $\delta_h$ of 1 to 10 given by hydrogen bonding between molecules. Even if the thermosensitive material and the matrix material are not compatible with other due to a large polarity of the decolorant, the phase separation structure can be formed by cooling with stirring. A surfactant may be added to allow the thermosensitive material and the matrix material to be compatible with each other.

When the thermosensitive material and the matrix material are cooled to the solidification point of the matrix material to form the phase separation structure, the size of a dispersion structure of the thermosensitive material varies depending on compatibility between the thermosensitive material and the matrix material. Specifically, the thermosensitive material is finely dispersed in the case of high compatibility between the large content of decolorant and the matrix material while coarsely dispersed in the case of low compatibility therebetween. Size of the dispersion structure is preferably, but not limitedly, 100 nm to 1 mm, and most preferably 1 to 100 µm. The size of 100 nm or more makes it possible to suppress influence on detection temperature from an interface between the thermosensitive material and the matrix material. The size of 1 mm or less makes it difficult to view each of the thermosensitive material and the matrix material, making it possible to reduce color nonuniformity of the temperature detection material.

[Solvent]

The temperature detection ink is necessary to be heated to at least the melting point of the thermosensitive material to initialize a color of the temperature detection ink. The boiling point of the solvent is therefore necessary to be higher than the melting point of the thermosensitive material. Considering handleability, the boiling point of the solvent of the temperature detection ink is preferably at least 20° C. higher than the melting point of the thermosensitive material. For example, when water having the boiling point 100° C. is used as the solvent, the melting point of the thermosensitive material is necessary to be lower than 100° C., and most preferably 60 to 80° C.

The solvent is preferably less compatible with the matrix material or the microcapsule containing the thermosensitive material.

When the phase separation structure including the matrix material is used as the temperature detection material, a highly polar solvent is preferably used as the solvent. The highly polar solvent most preferably includes water and alcohols such as glycerin, methanol, ethanol, and propanol; and includes, as usable solvents, ketones such as acetone, methylethylketone, and cyclohexanone; esters such as ethyl acetate, methyl acetate, ethyl propanoate, and methyl propanoate; and ethers such as dimethyl ether and tetrahydrofuran.

In the case of using the microencapsulated temperature detection material, a preferably usable solvent is a solvent to which material of the microcapsule is resistant.

When a highly polar material is used for the microcapsule, a lowly polar organic solvent is preferably used as the solvent. The lowly polar organic solvent most preferably includes nonpolar solvents such as hexane, benzene, and toluene; and oils such as petroleum, mineral oil, and silicone oil, and preferably includes ketones such as acetone, methylethylketone, and cyclohexanone; esters such as ethyl acetate, methyl acetate, ethyl propanoate, and methyl propanoate; and ethers such as dimethyl ether and tetrahydrofuran.

When a lowly polar material is used for the microcapsule, a highly polar organic solvent is preferably used as the solvent. The highly polar organic solvent most preferably includes alcohols such as glycerin, methanol, ethanol, and propanol; and includes ketones such as acetone, methylethylketone, and cyclohexanone; esters such as ethyl acetate, methyl acetate, ethyl propanoate, and methyl propanoate; and ethers such as dimethyl ether and tetrahydrofuran. Water may also be used as the solvent.

The temperature detection ink has the temperature detection function even in a liquid state. When the temperature detection ink is printed, handwritten, or stamped on an object and thus the solvent volatilizes, only the temperature detection material configures a printed matter. Such a printed matter can be used for the temperature indicator.

<Inkjet Ink>

The temperature detection ink can be applied to a charging control inkjet printer ink. The charging control inkjet printer ink includes a temperature detection material, a volatile organic solvent, a resin, and a conductive agent.

When the ink solution has a high resistance, ink particles do not tend to fly straightly, or tend to bend at an ink ejection part of the charging control inkjet printer. Resistance of the ink solution is therefore necessary to be adjusted to roughly 2000 Ωcm or less.

Since the resin, the pigment, and the organic solvent (specifically, 2-butanone or ethanol frequently used as the organic solvent of the inkjet printer ink) contained in the ink are less conductive, the resistance of the ink solution is large, about five thousand to tens of thousands ohm-centimeter. Such high resistance makes it difficult to perform desired printing in the charging control inkjet printer. A conductive agent is therefore necessary to be added to the ink to reduce resistance of the ink solution.

A complex is preferably used for the conductive agent. The conductive agent is necessary to be dissolved in the solvent, and importantly has no influence on a color tone. The conductive agent typically includes a salt structure. This is presumably because the salt structure has charge deflection within a molecule and thus exhibits high conductivity.

As a result of investigation in terms of the above perspective, the conductive agent preferably has a salt structure, and a cation preferably has a tetraalkylammonium ion structure. The alkyl chain may be either a straight chain or a branched chain, and its solubility in the solvent increases as the carbon number increases. However, as the carbon number is smaller, resistance can be reduced at a smaller additive rate. In the case of using the conductive agent in the ink, actual carbon number is about 2 to 8.

The anion preferably includes hexafluorophosphate ion and tetrafluoroborate ion because of their high solubility in the solvent.

Perchlorate ion also has high solubility but is unrealistically used in the ink because of its explosiveness. In addition, the anion includes chlorine ion, bromine ion, and iodine ion, which however undesirably tend to corrode metal such as iron or stainless steel if they come into contact with such metal.

As described above, a preferable conductive agent includes tetraethylammonium hexafluorophosphate, tetrapropylammonium hexafluorophosphate, tetrabutylammonium hexafluorophosphate, tetrapentylammonium hexafluorophosphate, tetrahexylammonium hexafluorophosphate, tetraoctylammonium hexafluorophosphate, tetraethylammonium tetrafluoroborate, tetrapropylammonium tetrafluoroborate, tetrabutylammonium tetrafluoroborate, tetrapentylammonium tetrafluoroborate, tetrahexylammonium tetrafluoroborate, and tetraoctylammonium tetrafluoroborate.

<Color Initialization Process>

Color initialization of the temperature detection ink is performed as follows: The temperature detection ink is heated to a temperature range of equal to or higher than the melting point of the thermosetting material and equal to or lower than the boiling point of the solvent and then cooled at a predetermined rate or higher. Any heating method may be used without limitation for this operation. In the case of heating ink in an ink container, examples of the heating method include a heater, a hot plate, and heating the ink container in a heated solvent. In the case of heating ink in a temperature indicator, a laminator may also be used.

A method of cooling after the heating is also not limited. Examples of the cooling method include natural cooling, a cooler, and cooling the ink container by a freezer or the like. A certain cooling rate or higher is necessary depending on crystallization speed of the thermosetting material. Rapid cooling by a cooling device is necessary for a material having a high crystallization speed, and natural cooling is preferably used for a material having a low crystallization speed.

Detection time of the temperature detection ink can also be adjusted by adjusting the rate of cooling by the cooling device. The temperature detection ink discolors with addition of time and temperature depending on the crystallization speed. Hence, the cooling rate can be positively slowed so that crystallization is beforehand advanced to cause slight color development before the ink is used for temperature control. This makes it possible to shorten the detection time compared with an equivalent temperature detection ink subjected to rapid cooling.

In this way, the color initialization method of the temperature detection ink includes a heating step of heating the temperature detection ink to a temperature equal to or higher than the melting point of the thermosetting material and equal to or lower than the boiling point of the solvent, and after the heating step, a step of cooling the temperature detection ink to equal to or lower than the glass transition temperature of the thermosetting material at a predetermined cooling rate. The cooling rate or the cooling temperature is adjusted depending on the detection time required for the temperature detection ink.

<Temperature Indicator>

Figure 6:
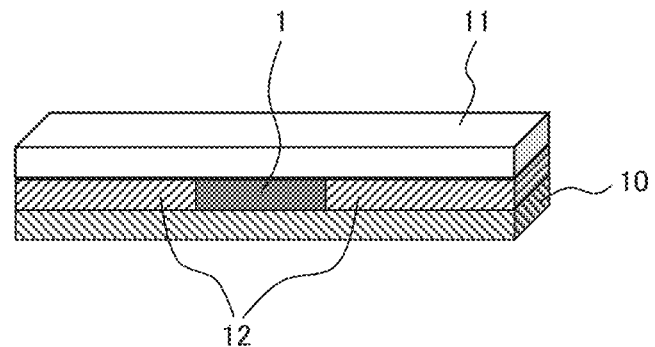
FIG. 6 is a schematic view illustrating a first example of a configuration of a temperature indicator.

The temperature indicator using the temperature detection ink is now described. FIG. 6 is a schematic view illustrating a first example of a configuration of the temperature indicator. The temperature indicator includes a substrate 10, a temperature detection ink 1 disposed on the substrate, a spacer 12 disposed on the substrate on both sides of the temperature detection ink 1, and a protective layer (transparent substrate) 11 disposed on the surface of the temperature detection ink. The temperature detection ink may be disposed on the substrate 10 while the solvent has been volatized.

Any material may be used without limitation for each of the substrate and the transparent substrate if the temperature detection ink or the color of the temperature detection material can be viewed through the material. The substrate and the transparent substrate are each preferably larger than the temperature detection material because the substrates may sandwich the temperature detection ink. A material of the substrate can be freely selected depending on a required function. Organic materials such as paper and plastics, inorganic materials such as ceramics and metal, or composite materials of such organic and inorganic materials may be freely selected. A layer structure may be formed by several materials. The material is selected according to a property required for the temperature indicator, such as high strength, heat resistance, weather resistance, chemical resistance, heat insulation, and conductivity. A seal can be used to allow the temperature indicator to adhere to an object to be detected.

A continuous porous material can also be used as the substrate. The continuous porous material can be impregnated with the temperature detection ink to modify workability. The workability varies depending on material of the continuous porous material. A material that does not degenerate even after long-term contact with the temperature detection material is required for the continuous porous material. Specifically, a usable material includes a material that is less likely to be dissolved in a typical organic solvent, such as polyethylene, polypropylene, and cellulose, and an inorganic compound such as silicon dioxide. A structure of the continuous porous material includes sponge, a nonwoven fabric, and a woven fabric. The cellulose may include paper used in production of books or documents. Powder of silicon dioxide, polyethylene, or polypropylene may be held by a binder having a similar chemical structure to form and use the continuous porous material. Since penetration density of the temperature detection material increases with an increase in gap density of the continuous porous material, reduction in color density can be correspondingly suppressed.

Any size of the transparent substrate is acceptable because the size is not limited if the temperature detection material can be viewed through the transparent substrate. In light of visibility, 30 μm or more is preferable for lateral length of a rectangular transparent substrate or for minor axis length of an elliptic transparent substrate.

A material of the transparent substrate can be freely selected depending on a required function. Organic materials such as paper and plastics, inorganic materials such as ceramics and metal, or composite materials of such organic and inorganic materials may be freely selected. The transparent substrate must be transparent because discoloration of at least part of the temperature detection ink is necessary to be viewed. For example, the material includes organic materials such as highly transparent paper and highly transparent plastics including acryl, polycarbonate, and cycloolefin, or highly transparent inorganic compounds such as glass and a transparent electrode film. A material formed into a thin film to improve transparency may also be used in addition to such highly transparent materials. A layer structure may be formed by several materials. From among them, an appropriate material can be selected according to a property required for the temperature indicator, such as high strength, heat resistance, weather resistance, chemical resistance, heat insulation, conductivity, and resistance to a thermal shock against rapid cooling.

Figure 7:
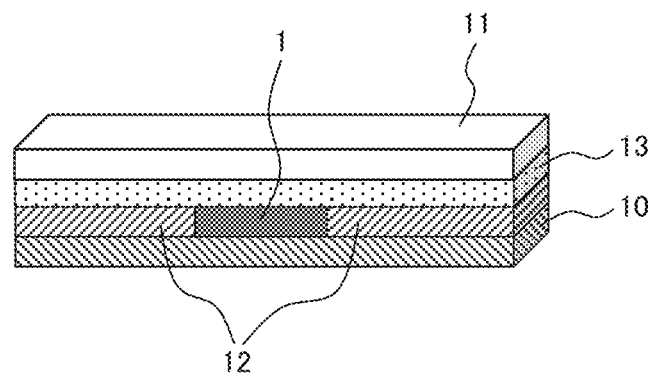
FIG. 7 is a schematic view illustrating a second example of the configuration of the temperature indicator.

FIG. 7 shows a second example of the configuration of the temperature indicator. FIG. 7 shows a modification of the temperature indicator of FIG. 6. The temperature indicator shown in FIG. 7 includes a substrate 10, a temperature detection ink 1 provided on the substrate, a spacer 12 provided on the substrate so as to horizontally sandwich the temperature detection ink, a transparent substrate 11 stacked on the temperature detection ink, and a printing sheet 13. The printing sheet 13 is disposed between the temperature detection ink 1 and the transparent substrate 11. The temperature indicator shown in FIG. 7 has the printing sheet held on the inside of the transparent substrate to allow printing information printed on the printing sheet to be read. However, discoloration of at least part of the temperature detection material is necessary to be made visible. For example, at least part of a portion, stacked on the temperature detection ink, of the printing sheet may be cut off to provide a portion where the printing sheet is not stacked on the temperature detection ink.

The transparent substrate and the substrate may each be subjected to machining, such as hole making. Hole making uncovers the printing sheet between the transparent substrate and the spacer. Such a structure makes it possible to write information on the uncovered printing sheet during transport, for example.

Figure 8:
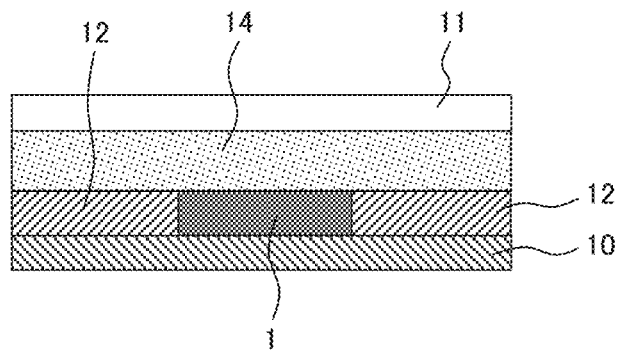
FIG. 8 is a schematic view illustrating a third example of the configuration of the temperature indicator.

FIG. 8 is a schematic view illustrating a third example of the configuration of the temperature indicator. FIG. 8 is a schematic view illustrating a configuration of a temperature indicator according to another modification of the temperature indicator of FIG. 6. The temperature indicator includes a substrate 10, a temperature detection ink 1 provided on the substrate, a spacer 12 provided on the substrate so as to horizontally sandwich the temperature detection ink, a heat insulation layer 14 disposed on the temperature detection ink 1, and a transparent substrate 11.

The heat insulation layer 14 may be stacked over or under the temperature detection ink 1. For example, an air layer, a gas layer of argon, nitrogen, and the like, a vacuum layer, and a porous material such as sponge and aerogel, fabric materials such as glass wool, rock wool, and cellulose fiber, and foamed materials such as urethane, polystyrene, and foamed rubber can be used for the heat insulation layer 14.

Disposing the heat insulation layer 14 over or under the temperature detection ink makes it possible to adjust time (hereinafter, referred to as temperature detection time) from a point where temperature outside the temperature detection material becomes out of the control temperature to a point where the temperature detection ink is discolored. The temperature detection time can be adjusted by material and thickness of each of the substrate 10 and the transparent substrate 11. Either of the substrate 10 and the transparent substrate 11 may be formed of a heat insulation material instead of additionally providing the heat insulation layer 14.

As described above, providing the heat insulation layer 14 and/or adjusting material or thickness of each of the substrate 10 and the transparent substrate 11 make it possible to control thermal conductivity from the substrate 10 to the temperature detection ink and thermal conductivity from the transparent substrate 11 to the temperature detection ink.

When the substrate 10 is attached in a form of a seal to an object, outdoor temperature is assumed to be different from surface temperature of the object. When the surface temperature of the object is desired to be detected, it is enough that the thermal conductivity from the substrate 10 to the temperature detection ink 1 is improved while the thermal conductivity from the transparent substrate 11 to the temperature detection ink 1 is reduced. For example, thermal conductivity of the substrate 10 may be made higher than thermal conductivity of the transparent substrate 11 by providing the heat insulation layer 14 over the temperature detection ink 1 and/or adjusting material or thickness of each of the transparent substrate 11 and the substrate 10. On the other hand, when outdoor temperature is desired to be detected, it is enough that the thermal conductivity from the substrate 10 to the temperature detection ink is reduced while the thermal conductivity from the transparent substrate 11 to the temperature detection ink is improved. For example, thermal conductivity of the transparent substrate may be made higher than thermal conductivity of the substrate by providing the heat insulation layer under the temperature detection ink 1 and/or adjusting material or thickness of each of the transparent substrate 11 and the substrate 10.

A plurality of types of (temperatures of) temperature detection inks may be used. Using a plurality of temperature detection inks makes it possible to provide a temperature indicator that uses different colors to detect three temperatures.

<Article Management System>

A quality control system using the temperature indicator is now described. The quality control system includes a control device that controls environment in which an article is placed, and a control terminal that acquires color tone information of the temperature detection material. When acquiring the color tone information, the control terminal transmits, to the control device, acquisition times of the article identification information and the color tone information in connection with whether color change has occurred.

Figure 9:
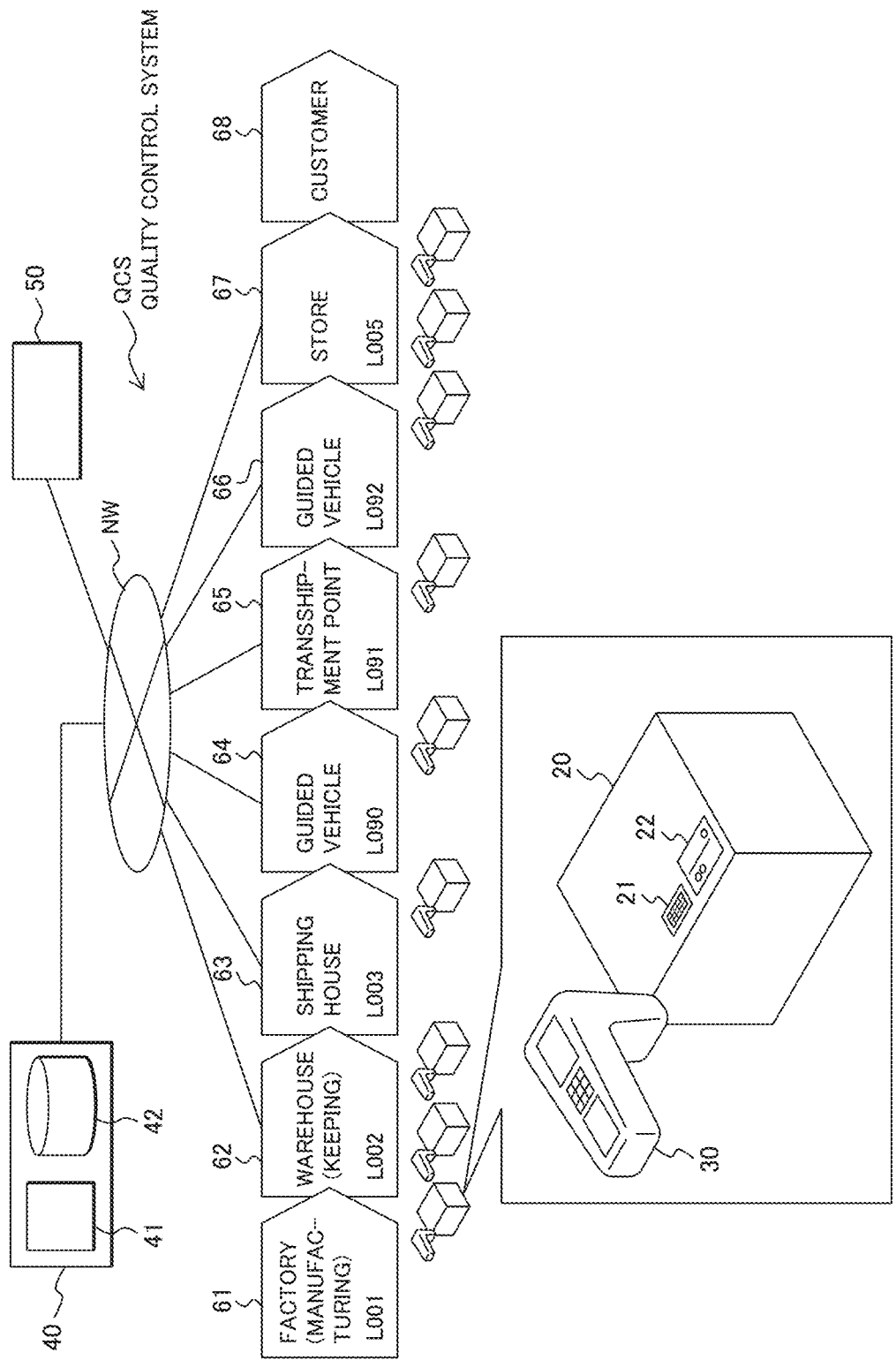
FIG. 9 is a block diagram of an article management system.

FIG. 9 shows a configuration of a quality control system. Description is now given with exemplary quality control in a distribution route in which an article 20 is manufactured in a factory 61, and then delivered to a store 67 and managed therein, and then delivered to a customer 68.

The quality control system QCS (article management system) includes a quality control terminal 30 (control terminal) acquiring a code (article identification information), (for example, barcode 21), attached to the article 20 and color tone information of the temperature indicator 22, a control server 40 (control device), and an administrator terminal 50. The quality control terminal 30, the control server 40, and the administrator terminal 50 are communicatively connected together via the network NW.

A distribution route includes the factory 61 manufacturing the article 20, a warehouse 62 keeping the article 20, a shipping house 63, a first guided vehicle 64, a transshipment point 65 in which the article 20 is transshipped to a second guided vehicle, the second guided vehicle 66, and the store 67. In each site, an operator collects quality control data using the quality control terminal 30.

The quality control data are collected when the article 20 is manufactured in the factory 61, kept in the warehouse 62, shipped from the shipping house 63, carried by the first guided vehicle 64, transshipped at the transshipment point 65, carried by the second guided vehicle 66, delivered to the store, or kept for sale in the store 67, for example.

In each site, an operator can check a color tone of the temperature detection ink to visually check a temperature management condition in each process and a temperature load state of the article 20. In addition to such visual check, the operator preferably acquires numerical information as the color tone.

In each of processes of shipment, delivery, and keeping, the operator uses the quality control terminal 30 to transmit, to the control server 40, quality control information including optical states and images of the article 20 and the relevant temperature detection ink, a reading site, and time.

The quality control terminal 30 is preferably used for reading the optical state of the temperature detection ink. As a result, each party concerning distribution of the article 20 can acquire a color tone of the thermosensitive material as numerical information to quantitatively control or share a state of the article 20 to be controlled in each step of the distribution process. The numerical information of the color tone includes the RGB color space, the HSV color space, and the Munsell color space in addition to the CIE color space such as L*a*b* and L*C*h*.

In the store 67, a color tone state of the temperature detection ink is checked for the delivered article 20, making it possible to visually check a temperature control condition until delivery to the store after shipment from the factory and a temperature load state of the article 20. In addition, the party can connect to the management server 40 via the quality control terminal 30 or the like to check information such as the quality control information 426 (see FIG. 10 as described later) until delivery of the article 20.

The quality control terminal 30 determines whether quality is maintained based on the article identification information of the barcode 21 and the color tone information of the temperature indicator 22, and displays results of such determination. Specifically, the quality control terminal 30 displays on a display unit that article distribution is not suitable if color change has occurred, and that article distribution is suitable if no color change has occurred. An operator confirms the results. The quality control data containing such determination results are transmitted to the control server 40 that then stores the data as the quality control information 426 (see FIG. 10 as described later).

In this embodiment, quality determination, i.e., whether quality is maintained, is performed by the quality control terminal 30. This is because determination processing is dispersed, rather than concentrated, in a system for many articles to be managed. In the case of the control sever 40 having high throughput, quality determination may be performed by the control sever 40.

Figure 10:
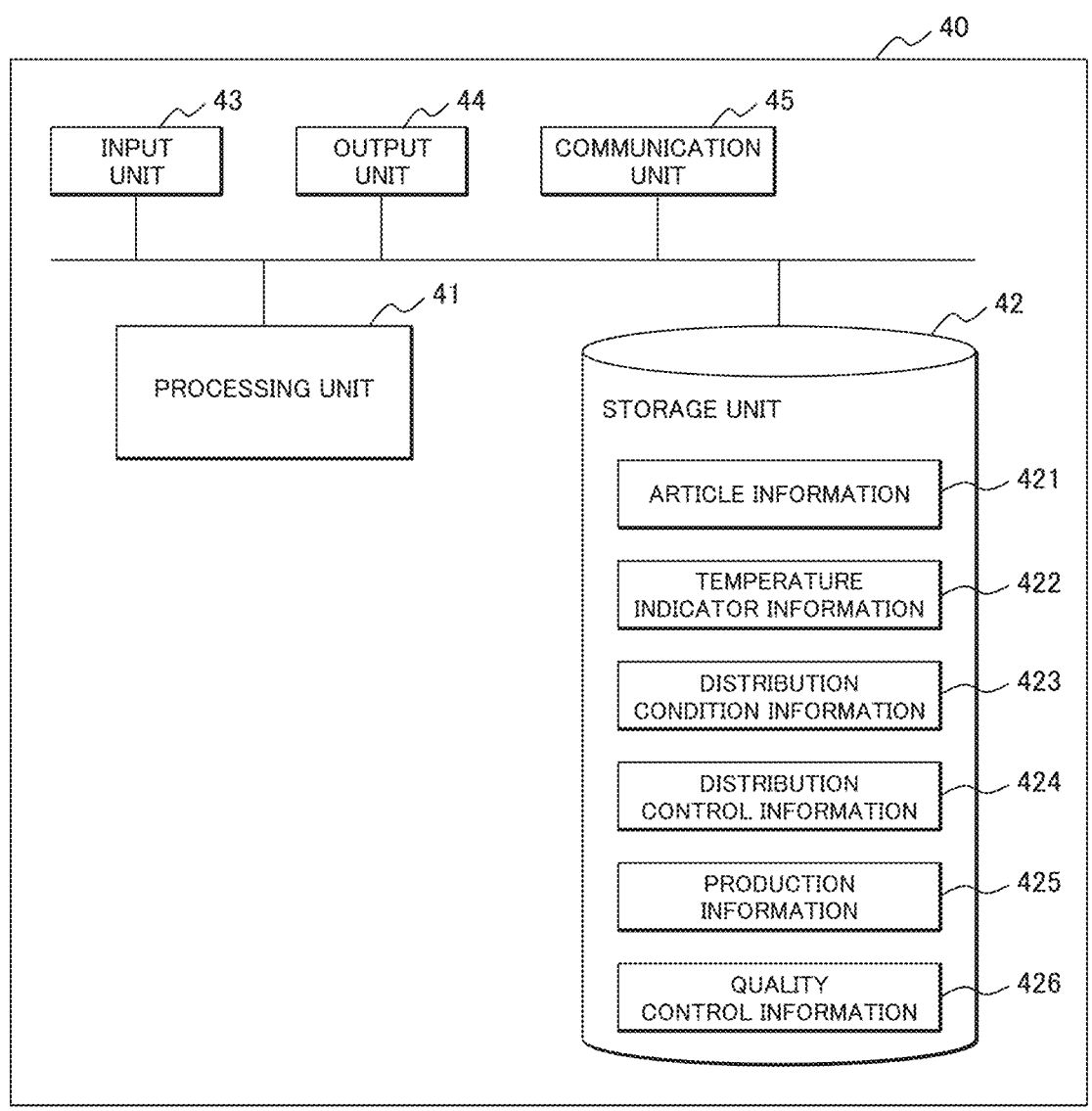
FIG. 10 is a block diagram of a control server.

FIG. 10 shows a configuration of the control server. The control server 40 includes a processing unit 41, a storage unit 42, an input unit 43, an output unit 44, and a communication unit 45. The storage unit 42 of the control server 40 stores article information 421 as detailed information of each article to be controlled, temperature indicator information 422, distribution condition information 423, distribution control information 424, production information 425, quality control information 426, and the like. The control server 40 swaps information with the quality control terminal 30, and when quality of the article 20 to be controlled is determined as "attention" or "stop", notifies the administrator terminal 50 of such a determination result. An administrator, which has received such a notice via the administrator terminal 50, performs operation such as attention to distribution of the article or suspension of the article.

The control server preferably stores, in the storage unit, color density/time information indicating a relationship between color density of the temperature detection ink attached to an article and time during which the article is placed in the relevant environment. The control server stores the color density/time information, allowing the control terminal to acquire the color density/time information based on the acquired article identification information and calculate time during which the article is placed in the environment based on the color density of the acquired color tone information and the color density/time information. In addition, the control terminal can display the calculated time on the display unit and can transmit the article identification information in connection with the calculated time to the control device. The time during which the article is placed in the environment may be calculated by the control server.

As an example of the article information stored in the control server, the article information 421 as information of an article to be controlled includes a code (article identification information), name (article name), production date, distribution limit date, size, price, surface color tone, necessity of temperature control for the temperature indicator 22, appropriate temperature, and a location of the temperature indicator (marking point). The temperature indicator information includes a code (article identification information), appropriate temperature, and determination temperature.

To summarize, the quality control system QCS (article management system) of this embodiment includes a control device (for example, the control server 40) that collects the color tone information of the temperature detection ink attached to an article and controls environment, in which the article is placed, based on the color tone information, and a control terminal (for example, the quality control terminal 30) that acquires the article identification information attached to an article to identify the article, and acquires the color tone information of the temperature detection ink. When the control terminal acquires the color tone information, it displays on the display unit whether color change has occurred, and transmits, to the control device, information (for example, temperature indicating data) of acquisition times of the article identification information and the color tone information in connection with whether color change has occurred. Consequently, the temperature indicating data acquired at each site of distribution can be managed in an integrated manner.

The control terminal displays on the display unit that distribution of an article is not suitable when color change has occurred, and that distribution of the article is suitable when no color change has occurred. This allows an operator at each site of distribution to immediately check whether an article is currently appropriately carried.

The control device stores, in the storage unit, color density/time information indicating a relationship between color density of the temperature detection material attached to an article and time during which the article is placed in the relevant environment. The control terminal acquires the color density/time information based on the acquired article identification information from the control device and calculates time during which the article is placed in the environment based on the acquired color density of the color tone information and the color density/time information, and displays the calculated time on the display unit and transmits the article identification information in connection with the calculated time to the control device. Consequently, article management can be performed using the color tone information based on the temperature detection material having a heating or cooling integral characteristic.

Example

The present invention is now described further specifically with reference to, but not limited to, an example and a comparative example.
(Preparation of Temperature Detection Ink)
In the example, four different temperature detection inks were produced in the following way.
(Preparation of First Temperature Detection Ink)
One mass part of 2'-methyl-6'-(N—P-tolyl-N-ethylamino) spiro[isobenzofuran-1(3H),9'-[9H]xanthene]-3-one (RED520 from YAMADA CHEMICAL CO., LTD.) was used as the leuco dye, one mass part of octyl gallate from Tokyo Chemical Industry Co., Ltd. was used as the color-developing agent, and 100 mass part of diphenyl phthalate from Tokyo Chemical Industry Co., Ltd. was used as the decolorant.

An oil phase, in which the leuco dye, the color-developing agent, the decolorant, 2,2'-azobis(isobutyronitrile) as a polymerization initiator, and styrene configuring a resin coating were dissolved in 2-ethylhexyl acrylate, was charged in an aqueous phase containing a sorbitan fatty acid ester as a surfactant and a sodium salt and stirred by a stirrer to produce a microcapsule containing the leuco dye, the color-developing agent, and the decolorant.

Pure water, resin including a copolymer of polyvinyl alcohol and polyvinyl acetate having a number average molecular weight (Mn) 10,000 (cycle number of polyvinyl alcohol:cycle number of polyvinyl acetate≈36:64, hydroxyl value 285), and the produced microcapsule were charged in a container having an agitating blade and mixed for about one hour to prepare a first temperature detection ink.
(Preparation of Second Temperature Detection Ink)
A second temperature detection ink was prepared in the same way as the first temperature detection ink except that one mass part of 3,3-bis(p-dimethylaminophenyl)-6-dimethylaminophthalide (CVL from YAMADA CHEMICAL CO., LTD.) was used as the leuco dye, one mass part of octyl gallate from Tokyo Chemical Industry Co., Ltd. was used as the color-developing agent, and 100 mass part of a mixture of diphenyl phthalate from Tokyo Chemical Industry Co., Ltd. and 2-phenylethyl phenylacetate in a mass ratio of 9:1 was used as the decolorant.
(Preparation of Third Temperature Detection Ink)
A third temperature detection ink was prepared in the same way as the first temperature detection ink except that one mass part of 6'-[ethyl(3-methylbuthyl)amino-3'-methyl-2'-(phenylamino)spiro[isobenzofuran-1(3H),9'-(H)xanthene]-3-one (S-205 from YAMADA CHEMICAL CO., LTD.) was used as the leuco dye, one mass part of octyl gallate from Tokyo Chemical Industry Co., Ltd. was used as the color-developing agent, and 100 mass part of a mixture of diphenyl phthalate from Tokyo Chemical Industry Co., Ltd. and 2-phenylethyl phenylacetate in a mass ratio of 8:2 was used as the decolorant.
(Preparation of Fourth Temperature Detection Ink)
One mass part of 2'-methyl-6'-(N—P-tolyl-N-ethylamino) spiro[isobenzofuran-1(3H),9'-[9H]xanthene]-3-one (RED520 from YAMADA CHEMICAL CO., LTD.) was used as the leuco dye, one mass part of octyl gallate from Tokyo Chemical Industry Co., Ltd. was used as the color-developing agent, and 100 mass part of diphenyl phthalate from Tokyo Chemical Industry Co., Ltd. was used as the decolorant.

An oil phase, in which the leuco dye, the color-developing agent, the decolorant, 2,2'-azobis(isobutyronitrile) as a polymerization initiator, and styrene configuring a resin coating were dissolved in 2-ethylhexyl acrylate, was charged in an aqueous phase containing a sorbitan fatty acid ester as a surfactant and a sodium salt and stirred by a stirrer to produce a microcapsule containing the leuco dye, the color-developing agent, and the decolorant.

Toluene, resin including a copolymer of polyvinyl alcohol and polyvinyl acetate having a number average molecular weight (Mn) 10,000 (cycle number of polyvinyl alcohol:cycle number of polyvinyl acetate≈36:64, hydroxyl value 285), and the produced microcapsule were charged in a container having an agitating blade and mixed for about one hour to prepare a fourth temperature detection ink.

As a comparative example, a temperature detection ink was prepared in the following way.
(Preparation of Fifth Temperature Detection Ink)
One mass part of 2'-methyl-6'-(N—P-tolyl-N-ethylamino) spiro[isobenzofuran-1(3H),9'-[9H]xanthene]-3-one (RED520 from YAMADA CHEMICAL CO., LTD.) was used as the leuco dye, one mass part of octyl gallate from Tokyo Chemical Industry Co., Ltd. was used as the color-developing agent, and 100 mass part of vitamin K4 from Tokyo Chemical Industry Co., Ltd. was used as the decolorant.

An oil phase, in which the leuco dye, the color-developing agent, the decolorant, 2,2'-azobis(isobutyronitrile) as a polymerization initiator, and styrene configuring a resin coating were dissolved in 2-ethylhexyl acrylate, was charged in an aqueous phase containing a sorbitan fatty acid ester as a surfactant and a sodium salt and stirred by a stirrer to produce a microcapsule containing the leuco dye, the color-developing agent, and the decolorant.

Pure water, resin including a copolymer of polyvinyl alcohol and polyvinyl acetate having a number average molecular weight (Mn) 10,000 (cycle number of polyvinyl alcohol:cycle number of polyvinyl acetate≈36:64, hydroxyl value 285), and the produced microcapsule were charged in a container having an agitating blade and mixed for about one hour to prepare a fifth temperature detection ink.

(Confirmation of Temperature History Display Function)

The ink container containing the first temperature detection ink was placed in 20° C. atmosphere, so that red coloring was confirmed. The ink container was heated by a heater to 80° C. that was equal to or higher than the melting point of the thermosetting material and equal to or lower than the boiling point of the solvent, so that immediate discoloration to white was confirmed. The ink container was then placed in 0° C. atmosphere for natural cooling, so that discoloration to red was confirmed after one hour.

Similarly, the ink container containing the second temperature detection ink was placed in 20° C. atmosphere, so that blue coloring was confirmed. The ink container was heated by a heater to 80° C. that was equal to or higher than the melting point of the thermosetting material and equal to or lower than the boiling point of the solvent, so that immediate discoloration to white was confirmed. The ink container was then placed in −10° C. atmosphere for natural cooling, so that discoloration to blue was confirmed after one hour.

Similarly, the ink container containing the third temperature detection ink was placed in 20° C. atmosphere, so that black coloring was confirmed. The ink container was heated by a heater to 80° C. that was equal to or higher than the melting point of the thermosetting material and equal to or lower than the boiling point of the solvent, so that the immediate discoloration to white was confirmed. The ink container was then placed in −20° C. atmosphere for natural cooling, so that discoloration to black was confirmed after one hour.

The ink container containing the fourth temperature detection ink was placed in 20° C. atmosphere, so that red coloring was confirmed. The ink container was heated by a heater to 80° C. that was equal to or higher than the melting point of the thermosetting material and equal to or lower than the boiling point of the solvent, so that immediate discoloration to white was confirmed. The ink container was then placed in 0° C. atmosphere for natural cooling, so that discoloration to red was confirmed after one hour.

The ink container containing the fifth temperature detection ink was placed in 20° C. atmosphere, so that red coloring was confirmed. The ink container was heated to 100° C. by a heater, so that ink temperature reached the boiling point of the solvent without discoloration from the red coloring state, and thus discoloration to white was failed to be confirmed. Hence, the discoloring state of the ink cannot be initialized.

(Production of Temperature Indicator)

Figure 11A:
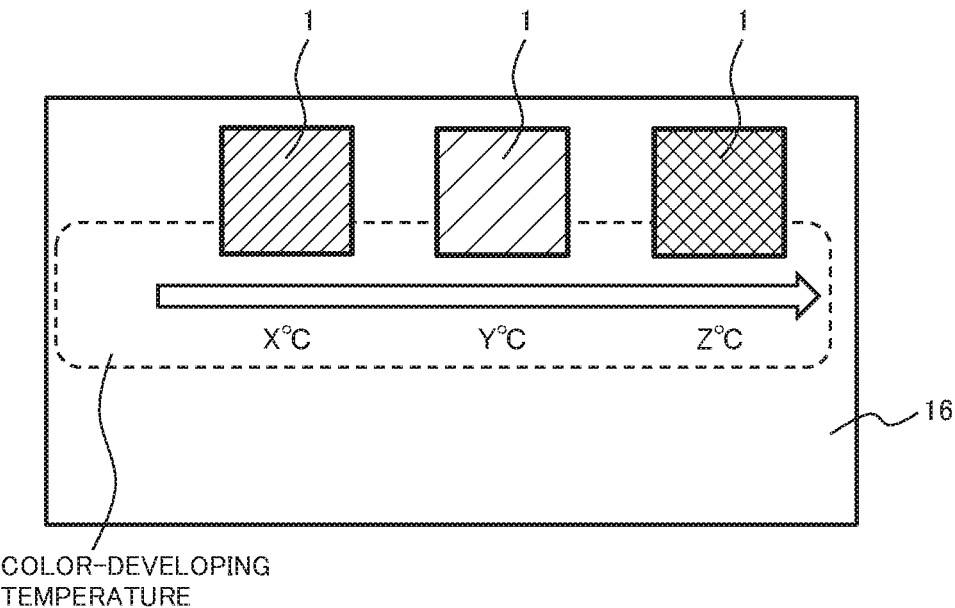
FIGS. 11A to 11C include schematic views illustrating a configuration of a temperature indicator according to Example.

Subsequently, a temperature indicator using the prepared temperature detection ink was produced. FIG. 11 includes schematic views of the produced temperature indicator, where (a) shows a configuration of the temperature indicator, (b) shows a substrate structure for the temperature indicator, and (c) shows verification results.

Figure 11B:
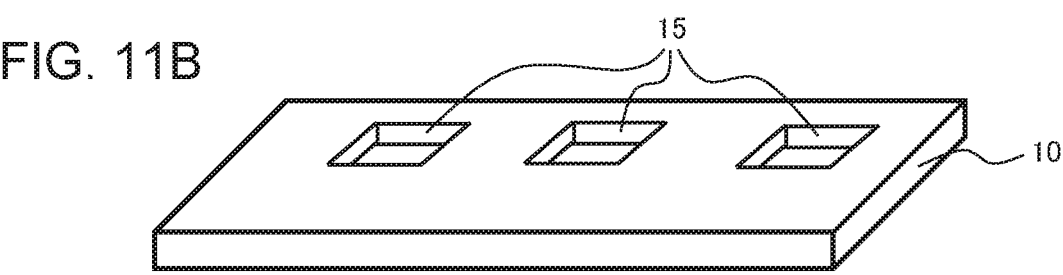
Figure 11C:
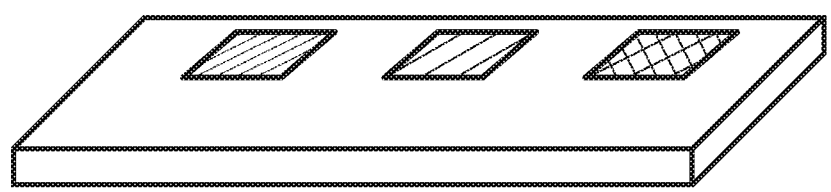

An acrylic board was molded having concave portions (recesses) 15 into which the temperature detection ink was to be poured as shown in FIG. 11B, and was used for a substrate 10 of the temperature indicator. The first, second, and third temperature detection inks 1 were heated by a heater to 80° C., which was equal to or higher than the melting point of the thermosetting material and equal to or lower than the boiling point of the solvent, and then naturally cooled to be colored white. The respective white temperature detection inks 1 were poured into the individual recesses 15 of the acrylic board. A transparent PET sheet film 16, on which a design such as temperature was printed, was pasted on the acrylic board as shown in FIG. 11A to produce the temperature indicator. As shown in FIG. 11, the temperature detection inks 1 were arranged on the substrate 10 in order of color-developing temperatures X° C., Y° C., and Z° C.

The produced temperature indicator was placed in 0° C. atmosphere, so that the third temperature detection ink was confirmed to be discolored to black after one hour. Similarly, the produced temperature indicator was placed in −10° C. atmosphere, so that it was confirmed that the third temperature detection ink was discolored to black after 30 minutes, and the second temperature detection ink was discolored to blue after one hour. Similarly, the produced temperature indicator was placed in 0° C. atmosphere, so that it was confirmed that the third temperature detection ink was discolored to black after 10 minutes, the second temperature detection ink was discolored to blue after 30 minutes, and the first temperature detection ink was discolored to red after one hour. The temperature indicator that had once discolored was placed in −30° C. atmosphere, so that the discolored state was confirmed to be maintained. Further, the discolored temperature indicator was heated using a laminator for 10 minutes at 80° C., which was equal to or higher than the melting point of any of the first, second, and third temperature detection inks and equal to or lower than the boiling point of the solvent, so that the discolored state was confirmed to return to white. The temperature indicator was then placed in 0° C. atmosphere, so that the third temperature detection ink was confirmed to be discolored to black after one hour. Similarly, the temperature indicator was placed in −10° C. atmosphere, so that it was confirmed that the third temperature detection ink was discolored to black after 30 minutes, and the second temperature detection ink was discolored to blue after one hour. Similarly, the temperature indicator was placed in 0° C. atmosphere, so that it was confirmed that the third temperature detection ink was discolored to black after 10 minutes, the second temperature detection ink was discolored to blue after 30 minutes, and the first temperature detection ink was discolored to red after one hour.

In this way, using the temperature indicator of this example makes it possible to confirm that deviation from the upper-limit set temperature is detectable, discoloration is irreversible, and color initialization is possible.

The present invention is not limited to the above-described example but includes various modifications. For example, the above example has been described in detail to clearly explain the present invention, and is not necessarily limited to embodiments having all the described configurations. In addition, part of a configuration of one example can be substituted for a configuration of another example, and a configuration of one example can be added to a configuration of another example. Furthermore, a configuration of one example can be added to, eliminated from, or substituted for part of a configuration of another example.

REFERENCE SIGNS LIST

1 . . . temperature detection ink,
2 . . . temperature detection material,

3 . . . solvent,
4 . . . temperature detection material,
5 . . . thermosensitive material,
6 . . . matrix material,
10 . . . substrate,
11 . . . protective layer (transparent substrate),
12 . . . spacer,
13 . . . printing sheet,
14 . . . heat insulation layer,
15 . . . concave portions (recesses),
16 . . . sheet film,
20 . . . article,
21 . . . barcode,
22 . . . temperature indicator,
30 . . . quality control terminal (control terminal),
40 . . . control server (control device),
41 . . . processing unit,
42 . . . storage unit,
421 . . . article information,
422 . . . temperature indicator information,
426 . . . quality control information,
50 . . . administrator terminal,
NW . . . network,
QCS . . . quality control system (article management system).

The invention claimed is:

1. A temperature detection ink, comprising:
a temperature detection material; and
a solvent,
wherein the temperature detection material has a structure in which a thermosensitive material containing a leuco dye, a color-developing agent, and a decolorant is contained in a microcapsule, or a structure in which a phase containing the thermosensitive material is phase-separated from a matrix material,
the thermosensitive material is solidified while being decolored by cooling from a molten state to a glass transition temperature or lower at a predetermined rate or higher,
the thermosensitive material has a glass transition temperature of −20 to 60° C., and
the thermosensitive material has a melting point that is 60 to 250° C. and lower than the boiling point of the solvent.

2. The temperature detection ink according to claim 1, wherein the glass transition temperature of the thermosensitive material is −20 to 25° C.

3. The temperature detection ink according to claim 1, wherein the melting point of the thermosensitive material is 60 to 150° C.

4. The temperature detection ink according to claim 1, wherein the boiling point of the solvent is 20° C. higher than the melting point of the thermosensitive material.

5. The temperature detection ink according to claim 1, wherein a concentration of the matrix material is 0.1 to 100 mass parts to 1 mass part of the thermosensitive material.

* * * * *